| United States Patent Office | 3,205,270
Patented Sept. 7, 1965 |
|---|---|

3,205,270
DERIVATIVES OF 2,2'-BIPHENOL
John J. Jaruzelski, Westfield, N.J., and Marjan Kolobielski, Pittsburgh, and Chester S. Sheppard, Edgewood, Pa., assignors to United States Steel Corporation, a corporation of New Jersey
No Drawing. Filed June 22, 1961, Ser. No. 118,762
2 Claims. (Cl. 260—613)

This invention relates to novel ester-type derivatives of 2,2'-biphenol, some of which have good properties as primary resin plasticizers, others as secondary resin plasticizers, and still others as stabilizers for plasticized resins.

At the present time, the diesters of dibasic carboxylic acids such as dioctyl phthalate or of glycols such as dipropylene glycol dibenzoate and phosphate esters such as tricresyl phosphate are the principal types of primary plasticizers in commercial use. Fatty acid esters, such as n-butyl stearate, are used as secondary plasticizers when a blending of two or more plasticizers is desired to obtain a specific property requirement. As resin stabilizers, a variety of compounds are presently employed. Among the more important are certain organometallic compounds, compounds containing one or more oxirane rings, and compounds containing one or more aromatic hydroxyl groups, especially those containing orthocarboxyl groups. Phenolic esters of carboxylic acids have not been generally used as commercial plasticizers. However, we have found the unsymmetrical 2,2'-biphenol to be an especially suitable phenolic material for obtaining plasticizers of extremely low volatility. Our novel compounds are ester-type derivatives of 2,2'-biphenol having the structural formula:

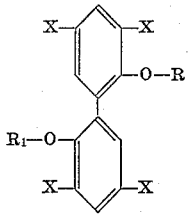

where X is chosen from the group consisting of hydrogen and halogen, where R is chosen from the group consisting of hydrogen, —CH$_2$—CH$_2$—OH, and

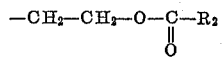

where R$_1$ is chosen from the group consisting of

—CH$_2$—CH$_2$—OH and

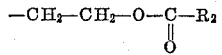

and where R$_2$ may be any alkyl radical containing from 1 to 23 carbon atoms.

For a complete understanding of the invention, the reactions to produce the ester-type derivatives from 2,2'-biphenol will be considered initially. Relative thereto, it has been found that 2,2'-biphenol will react with ethylene oxide to produce a novel intermediate derivative of 2,2'-biphenol, namely, 2,2'-bis (β-hydroxyethoxy) biphenyl, which can be esterified similarly to, and more readily than 2,2'-biphenol to yield novel primary resin plasticizers and secondary resin plasticizers having properties corresponding to and in many instances an improvement on such plasticizers derived from 2,2'-biphenol. After these reactions have been set forth, the characteristics of the resulting derivatives will be discussed relative to their utility respectively as primary resin plasticizers, secondary resin plasticizers or stabilizers for plasticized resin.

For easier identification and description, reference will be made to Formulas I, II, III and IV. The method of preparation of ester-type derivatives of 2,2'-biphenol (and its tetrahalogen derivatives) of the type depicted by Formulas I and II is given by the following equation:

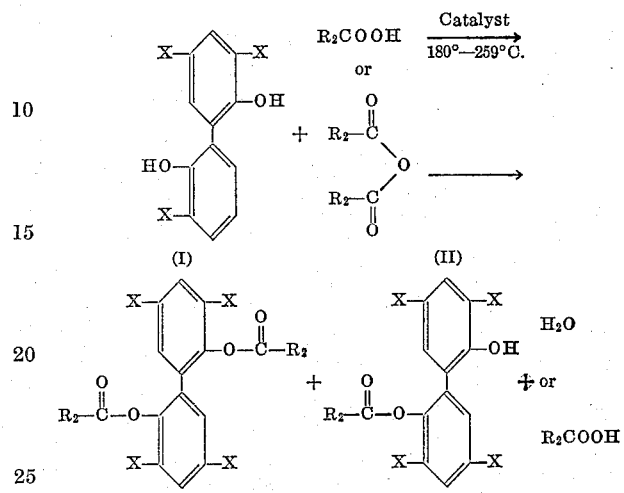

where R$_2$ is any alkyl radical containing from 1 to 23 carbon atoms and where X is chosen from the group consisting of hydrogen and halogen.

The catalyst may be an ester of phosphorus acid, phosphorus trichloride, titanium tetraalkoxide, antimony trichloride or trioxide, bismuth trichloride, arsenic trichloride, aluminum trialkoxide, sulfuric acid, arylsulfonic acids, zinc or lead stearate, polyphosphoric acid or phosphoric acid.

The method of preparation of ester-type derivatives of 2,2'-biphenol (and its tetrahalogen derivatives) of the type depicted by Formulas III and IV is given by the following equations:

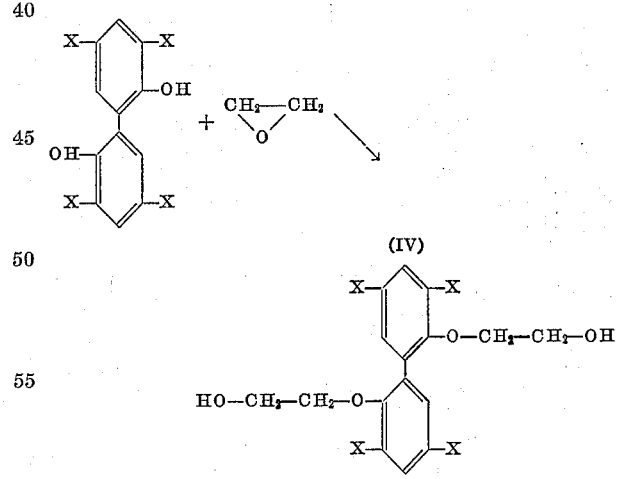

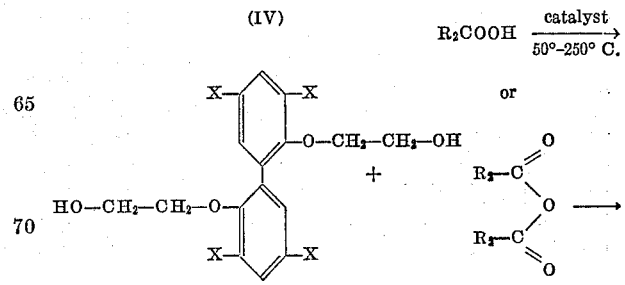

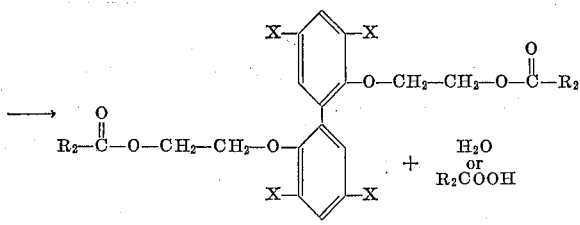

where $R_2$ is any alkyl radical containing from 1 to 23 carbon atoms and where X is chosen from the group consisting of hydrogen and halogen. The catalyst may be any of the typical esterification catalysts such as hydrochloric acid, sulfuric acid and arylsulfonic acids. No catalyst is needed when the anhydride is used in either of the above methods; however, conventional esterification catalysts enhance the reaction. This reaction is of practical importance only with acids of relatively low molecular weight, since anhydrides of the acids of higher molecular weight are not common.

It has been found that the diesters of Formulas I and III are novel primary plasticizers for polyvinyl chloride resins when $R_2$ is an alkyl radical containing six or fewer carbon atoms. This is, they are completely compatible with the resin. When $R_2$ is an alkyl radical containing more than six carbon atoms, the diesters are secondary plasticizers. That is, they are designed to be used in conjunction with a primary plasticizer in order to obtain elastomers fulfilling a specific property requirement such as color, low volatility or clarity. For a primary plasticizer, $R_2$ may be methyl to hexyl with a preferred $R_2$ of propyl to hexyl. For a secondary plasticizer, $R_2$ may be heptyl to tricosyl, with a preferred $R_2$ of heptyl to pentadecyl. This demarcation between primary and secondary plasticizers is somewhat flexible and may vary with different resins. The plasticized resins or elastomers obtained from these diesters and polyvinyl chloride display low volatility and exceptionally high tensile strength, modulus, and tear resistance. As secondary plasticizers, the higher diesters are superior to n-butyl stearate, a typical commercial secondary plasticizer. These novel elastomers may be molded into any number of products, especially where high tensile strength and/or low volatility are desired.

The ester-type derivatives of 2,2'-biphenol that fall into the primary plasticizer class may be incorporated in polyvinyl chloride resins in amounts from 10 to 120 parts per 100 parts of resin, but the preferred concentration is in the range of 30 to 80 parts per 100 parts of resin, all parts by weight. Several resins, such as polyvinyl chloride, polyvinyl chloride-polyvinyl acetate copolymers, polystyrene, and styrene copolymers, are compatible with these new plasticizers, but the preferred resin is polyvinyl chloride. The derivatives that fall into the secondary plasticizer class may be incorporated with a suitable primary plasticizer to give a plasticizer blend containing from 10 to 90 percent of the secondary plasticizer. The preferred range will depend upon the specific property requirement desired in the elastomer and also upon the alkyl chain length of the biphenol diester and will generally be in the range of 25 to 75 percent.

As discussed hereinabove, plasticizers for resins are chosen with properties to obtain elastomers fulfilling specific property requirements. One of the important properties of our novel plasticizers is their low volatility. As the number of carbon atoms in $R_2$ increases, the volatility of the diesters decreases to extremely low values. However, there is also a gradual decrease in resin compatibility. Thus, when $R_2$ contains more than six carbon atoms, the resultant diesters are no longer completely compatible with polyvinyl chloride when used alone as primary plasticizers. However, these diesters were found to be excellent secondary plasticizers for polyvinyl chloride when used in conjunction with another primary plasticizer such as dioctyl phthalate. With other resins, the compatibility may be greater or lesser than with polyvinyl chloride and therefore the line of demarcation between our primary and secondary plasticizers is somewhat flexible.

The monoesters of Formula II are color stabilizers for commercial plasticizers. The elastomers obtained from plasticizers incorporating these monoesters are of considerably lighter color after thermal treatment than those obtained without incorporating them. For a plasticizer stabilizer, $R_2$ may be any alkyl radical from methyl to tricosyl. The preferred $R_2$, however, would be from heptyl to heptadecyl, since this range gives stabilizers with an optimum combination of low volatility and good compatibility with polyvinyl chloride. The monoesters may be used as stabilizers for plasticized polyvinyl chloride resins by incorporating them in the plasticizers in amounts from 1 to 10 percent by weight, with the preferred range being generally about 5 percent in the plasticizer or about 2 percent in the plasticized resin.

A complete understanding of the invention may be obtained from the following typical examples of process showing how the compounds are made and used.

EXAMPLE 1.—2,2'-BIPHENOL DILAURATE

[Formula I, $R_2$=undecyl, a secondary plasticizer. Also 2-hydroxy-2'-lauroxybiphenol, Formula II, a resin stabilizer]

Lauric acid (200 grams), 2,2'-biphenol (93 grams), phosphorous trichloride (2 ml.), and xylene (35 ml.) were refluxed under a Dean-Stark water trap at a pot temperature of 235° C. After 16 hours, 17 ml. of water were obtained in the water trap. This amount of water indicates an esterification 92 percent complete. The xylene was removed by vacuum, and the product distilled to separate the monoester (Formula II) and the diester (Formula I). The monoester, 2-hydroxy-2'-lauroxybiphenol, distilled in the range 160° to 230° C. at 0.4 mm. of Hg and was obtained in a yield of 9.6 percent. The diester, 2,2'-biphenol dilaurate, distilled in the range 260° to 263° C. at 0.4 mm. of Hg and was obtained in a yield of 83 percent. It had a refractive index of 1.5005 at 25° C. and was an almost colorless liquid. Its infrared spectrum shows an ester carbonyl peak at 5.7 microns, no carboxylic acid carbonyl, and no hydroxyl group.

EXAMPLE 2.—2,2'-BIPHENOL DIPELARGONATE.

[Formula I, $R_2$=octyl, a secondary plasticizer]

Pelargonic acid (79.0 grams), 2,2'-biphenol (46.5 grams), titanium tetra-utoxide (2 ml.), and xylene (30 ml.) were refluxed as in Example 1. After 5 hours and 45 minutes, esterification was 98 percent complete. Distillation gave 2,2'-biphenol dipelargonate boiling in the range 231°–232° C. at 0.5 mm. of Hg with an $n_D^{25}$ =1.5077. The diester (Formula I) was an almost colorless liquid, and its infrared spectrum was in accord with its structure.

EXAMPLE 3.—3,3'-,5,5'-TETRACHLORO-2,2'-BIPHENOL DIPELARGONATE

[Formula I, $R_2$=octyl, X=chlorine, a secondary plasticizer. Also 3,3',5,5'-tetrachloro-2-hydroxy-2'-pelargonoxybiphenyl, Formula II, a resin stabilizer]

Pelargonic acid (52.7 grams), 3,3'-,5,5'-tetrachloro-2,2'-biphenol (54 grams), titanium tetrabutoxide (2 ml.), and xylene (30 ml.) were refluxed as in Example 1. After 12 hours, esterification was 95 percent complete. Distillation gave 3,3'-,5,5'-tetrachloro-2,2'-biphenol dipelargonate (80 grams) boiling in the range 259.5°–262° C. at 0.35 mm. of Hg along with 3,3',5,5'-tetrachloro-2-hydroxy-2'-pelargonoxybiphenyl (11.4 grams) boiling in the range 234° to 264° C. at 0.35 mm. of Hg. The infrared spectra of the respective diester (Formula I) and monoester (Formula II) were in accord with their structures. The diester was a light-yellow liquid, which had a chlorine content of 23.69 percent as compared to the calculated value of 23.50 percent.

EXAMPLE 4.—2,2'-DIPROPIONOXYBIPHENYL

[Formula I, $R_2$=ethyl, a primary plasticizer]

Sixty-five grams of 2,2'-biphenol was added to 90 grams of propionic anhydride containing 0.05 gram of p-toluenesulfonic acid. This mixture was heated to 70° C. and stirred for 6 hours. The excess anhydride and propionic acid were removed by distillation and the residue fractionated. The desired product, 2,2'-dipropionoxybiphenyl, distilled over the range 153°–159° C. at 1.0 mm. of mercury and amounted to 92.2 grams (88.5% yield).

EXAMPLE 5.—2,2'-BIPHENOL DISTEARATE

[Formula I, $R_2$=heptadecyl, a secondary plasticizer]

Stearic acid (184.6 grams), 2,2'-biphenol (61.4 grams), phosphorus trichloride (2 ml.), and xylene (40 ml.) were refluxed as in Example 1. After 16 hours, esterification was 94 percent complete. The xylene and unreacted stearic acid were removed by vacuum distillation to give 2,2'-biphenol distearate, a white solid melting at 52°–55° C. The infrared spectrum was in accord with its structure.

EXAMPLE 6.—2,2'-BIS($\beta$-HYDROXYETHOXY) BIPHENYL

[Formula IV, an intermediate for Formula III ester-type derivatives]

Compounds of Formula III are made by first converting 2,2'-biphenol or its 3,3',5,5'-tetrahalogen derivatives to 2,2'-bis($\beta$-hydroxyethoxy) biphenyl (Formula IV) or its tetrahalogen derivatives. This conversion was effected as follows: 2,2'-biphenol (558 grams) and potassium hydroxide (6 grams) were dissolved in bis (ethoxy-ethyl) ether (800 ml.) and stirred at 140° C. Ethylene oxide was passed into the stirred solution at a rate of 400 ml. per minute for 7 hours. The ethylene oxide stream was discontinued and the reaction mixture stirred for another 30 minutes at 140° C. A total of 276 grams of ethylene oxide was absorbed, the theoretical quantity being 264 grams for reaction of two moles per mole of biphenol. The reaction mixture was poured into 4 liters of water and stirred for several minutes and then the oily product was allowed to settle. The aqueous layer was decanted and the oil washed again with 4 liters of water, during which time the oil product began to solidify. The mixture was filtered and the solid dried in a desiccator over calcium chloride to obtain 719 grams 2,2'-bis($\beta$-hydroxyethoxy) biphenyl in 84.7% yield and melting at 65°–67° C. The white product was recrystallized from a benzene-hexane mixture to give 628 grams of the pure compound in 76.3% yield and melting at 70°–72° C. Elementary analysis gave carbon=70.42 percent and hydrogen=6.64 percent. Calculated values are carbon=70.08 percent and hydrogen=6.57 percent. The infrared spectrum was in accord with the structure.

EXAMPLE 7.—2,2'-BIS($\beta$-HYDROXYETHOXY) BIPHENYL DIPELARGONATE

[Formula III, $R_2$=octyl, a secondary plasticizer]

2,2'-bis($\beta$-hydroxyethoxy) biphenyl (68.5 grams), pelargonic acid (79 grams), xylene (35 ml.), and para-toluene-sulfonic acid (1.5 grams) were refluxed as in Example 1. After two hours, esterification was essentially 100 percent complete. The product was treated with 0.4 gram of sodium carbonate and distilled to give 110 grams of 2,2'-bis($\beta$-hydroxyethoxy) biphenyl dipelargonate, boiling in the range 260°–262° C. at 0.4 mm. Hg. The product was an almost colorless liquid, and its infrared spectrum was in accord with its structure.

EXAMPLE 8.—2,2'-BIS($\beta$-HYDROXYETHOXY) BIPHENYL DIPROPIONATE

[Formula III, $R_2$=ethyl, a primary plasticizer]

2,2'-bis($\beta$-hydroxyethoxy) biphenyl (100 grams) and propionic anhydride (100 grams) were heated under 20 mm. of Hg to 150° C. Propionic acid was distilled from the reaction mixture. After two hours, the reaction was complete. The excess anhydride was distilled at 0.35 mm. of Hg and the product subsequently distilled to give 137.5 grams of 2,2'-bis($\beta$-hydroxyethoxy) biphenyl dipropionate, boiling in the range 217° to 219° at 0.35 mm. of Hg. The product is a colorless liquid, and its infrared spectrum is in accord with its structure. Elementary analysis gave C=68.13 percent; H=6.84 percent. The calculated values are: C=68.39 percent; H=6.74 percent.

EXAMPLE 9.—3,3',5,5'-TETRACHLORO-2,2'-BIS($\beta$-HYDROXYETHOXY) BIPHENYL DIPROPIONATE

[Formula III, X=chloro, $R_2$=ethyl, a primary plasticizer]

3,3',5,5'-tetrachloro-2,2'-bis($\beta$-hydroxyethoxy) biphenyl (82.5 grams), prepared from 3,3',5,5'-tetrachloro-2,2'-biphenol and ethylene oxide as described in Example 6, and propionic anhydride (55 grams) were heated at 65 mm. of Hg until no more propionic acid distilled from the reaction mixture. The excess propionic anhydride was removed by distillation to give the crude 3,3',5,5'-tetrachloro-2,2'-bis($\beta$-hydroxyethoxy) biphenyl dipropionate (101 grams). Distillation gave the pure diester (85 grams) boiling in the range 241.5°–243.5° C. at 0.3 mm. of Hg. The product was a light-yellow liquid, and its infrared spectrum was in accord with its structure.

Three of the diesters were chosen as typical of our novel primary plasticizers; namely, 2,2'-biphenol dipropionate, 2,2'-bis($\beta$-hydroxyethoxy) biphenyl dipropionate, and 3,3',5,5'-tetrachloro - 2,2'-bis($\beta$-hydroxyethoxy) biphenyl dipropionate. Each diester was compounded with polyvinyl chloride "Geon 121" resin using 39 parts of diester to 59 parts of resin to 2 parts of "Thermolite 31" stabilizer, all parts being by weight. The mix was baked at 350° F. for 10 minutes and the slabs molded in a four-place ASTM mold at 290° F. A similar elastomer was prepared from dioctyl phthalate, a commercial primary plasticizer for polyvinyl chloride resins. A comparison of the properties of the elastomers is given below:

*Table I*

| Plasticizer Used [1] | BIP | DPBP | TCP | DOP |
|---|---|---|---|---|
| Tensile Strength, p.s.i. | 3,209 | 2,416 | 2,949 | 1,873 |
| Elongation, percent | 466 | 335 | 283 | 486 |
| Modulus at 100% Elongation, p.s.i. | 1,101 | 1,344 | 2,323 | 702 |
| Tear Resistance, lb./in | 339.7 | 486.2 | 670.6 | 211.5 |
| Volatility,[2] Wt. Loss, g./sq./in. hr. | 0.0729 | 0.0281 | 0.0149 | 0.0270 |
| Hardness[3] | 88 | 87 | 97 | 78 |

[1] BIP=2,2'-biphenol dipropionate; DPBP=2,2'-bis ($\beta$-hydroxyethoxy) biphenyl dipropionate; TCP=3,3', 5,5'-tetrachloro-2,2'-bis ($\beta$-hydroxyethoxy) biphenyl dipropionate; DOP=dioctyl phthalate.
[2] Average value over a 4-hour period at 350° F. of a disc measuring $d$=1.25 and $h$=0.075 inch.
[3] Shore Durometer, Type A-2.

2,2'-biphenol dilurate prepared in Example 1 was chosen as typical of our novel secondary plasticizers. A 25 percent composition in dioctyl phthalate was compared with a 25 percent composition of n-butyl stearate, a commercial secondary plasticizer, in dioctyl phthalate. The elastomers were prepared as described hereinabove, and a comparison of the properties of the elastomers is given below:

Table II

| Plasticizer [1] | BDL | NBS |
|---|---|---|
| Tensile Strength, p.s.i. | 1,534 | 1,470 |
| Elongation, percent | 289 | 326 |
| Modulus st 100% Elongation, p.s.i. | 923 | 780 |
| Tear Resistance, lb./in. | 253.3 | 107.5 |
| Thermal Stability, Wt. Loss, g./sq. in./hr. | 0.0186 | 0.0378 |
| Hardness | 81 | 83 |
| Color | 10 | 9 |
| Clarity, Percent Light Transmission | 22.9 | 19.0 |

[1] BDL=25 percent 2,2'-biphenol dilaurate and 75 percent dioctyl phthalate; NBS=25 percent n-butyl stearate and 75 percent dioctyl phthalate.

A comparison of the properties of the elastomers prepared from the 2,2'-biphenol diesters that were chosen as primary plasticizers with those obtained from dioctyl phthalate under the same conditions shows the superiority of the new diester plasticizers in such properties as tensile strength, modulus, tear resistance, hardness, and volatility. Only the 2,2'-biphenol dipropionate elastomer had a somewhat higher volatility than the dioctyl phthalate elastomer, this being the lowest-boiling diester prepared according to the specific examples. Other diesters of higher molecular weight and higher boiling point where the alkyl radical contains from 4 to 6 carbon atoms exhibit progressively lower volatility. The color property of the elastomers prepared from these 2,2'-biphenol diesters is variable; i.e., some elastomers are water-white while others are yellow, but this is not detrimental, since most such elastomers are dyed to specific colors.

A comparison of the properties of the elastomer prepared using 2,2'-biphenol dilaurate as a secondary plasticizer with those of the elastomer obtained by using the commercial secondary plasticizer, n-butyl stearate, under the same conditions, shows the superiority of the new diester plasticizer in such properties as tensile strength, modulus, tear resistance, volatility, color, and clarity.

In order to determine the effect of a monoester of the invention on the thermal stability of a plasticized resin, an elastomer was prepared using dipropylene glycol dibenzoate containing 5 weight percent 2-hydroxy-2'-pelargonoxybiphenyl as the plasticizer and polyvinyl chloride as the resin. Another elastomer was prepared similarly without the 2-hydroxy-2'-pelargonoxybiphenyl. Both of these elastomers were heated at 350° F. for 4 hours. The elastomer containing the 2-hydroxy-2'-pelargonoxybiphenyl was found to be considerably lighter in color after the thermal treatment than the other elastomer. The other properties were not adversely affected by formulation with the monoester.

The 2,2'-biphenol ester-type derivatives described hereinabove were prepared by esterification with carboxylic-acid anhydrides or by a catalyzed esterification with carboxylic acids. It is within the scope of our invention, however, to employ any of the conventional esterification methods, such as by using acid chlorides rather than anhydrides or carboxylic acids. Although acid chlorides give excellent yields of esters with phenols and alcohols, they are expensive and are difficult to transport, and as a result, their use is not commercially attractive.

Elastomers are prepared commercially for a specific application, and it is this specific use that determines the properties desired in the elastomer. The desired properties may usually be obtained in an elastomer by choosing the optimum combination of a number of variables, such as the ratio of plasticizer to resin, the cure temperature, the time of cure, and the proper selection of a primary plasticizer or a blend of primary and secondary plasticizers, and stabilizers. These modifications are within the scope of our invention.

As explained above, the unsymmetrical 2,2'-biphenol and its novel intermediate 2,2'-bis($\beta$-hydroxyethoxy) biphenyl may be reacted with carboxylic acids and carboxylic-acid anhydrides to produce diesters and monoesters. These may be incorporated in resins, such as polyvinyl chloride, polyvinyl chloride-polyvinyl acetate copolymers, polystyrene and styrene copolymers, the preferred resin being polyvinyl chloride. The diesters are prepared with carboxylic acids having alkyl radicals, designated as $R_2$ and containing from 1 to 23 carbon atoms are novel resin plasticizers. From experience gained in elastomer formulation, the diesters have been designated as primary and secondary plasticizers depending on the somewhat flexible choice of $R_2$=methyl to hexyl and $R_2$=heptyl to tricosyl respectively. This line of demarcation between primary and secondary plasticizers may vary slightly with different resins. The corresponding monoesters may be incorporated in resins as stabilizers for plasticized resins.

As primary plasticizers, the preferred $R_2$=propyl to hexyl inclusive and a formulation of 30 to 80 parts thereof with 100 parts resin. As secondary plasticizers, the preferred $R_2$=heptyl to pentadecyl inclusive and a formulation of 25 to 75 parts thereof in the plasticizer blend. The results of resins plasticized with our novel primary plasticizers show that the resultant plasticized resins or elastomers obtained are superior to those obtained with dioctyl phthalate in such properties as tensile strength, modulus, tear resistance, hardness and volatility. The results of resins plasticized with our novel secondary plasticizers show that the resultant elastomers obtained are superior to those obtained with n-butyl stearate in such properties as tensile strength, modulus, tear resistance, volatility, color and clarity. For the monoesters the preferred $R_2$=heptyl to heptadecyl inclusive, and a formulation of 1 to 3 parts thereof with 100 parts plasticized resin.

The results of resins plasticized incorporating our monoesters as novel resin stabilizers show that the resultant elastomers obtained are stabilized against discoloration due to thermal treatment while the other properties of the elastomers are not adversely affected by formulation with the monoesters.

Although we have disclosed herein the preferred practice of our invention, we intend to cover as well any change or modification therein which may be made without departing from the spirit and scope of the invention.

We claim:

1. A composition of matter, the compound:

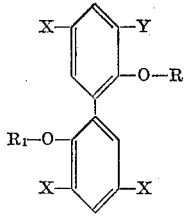

where X is chosen from the group consisting of hydrogen and chlorine, where R is chosen from the group consisting of hydrogen, —$CH_2$—$CH_2$—OH, and

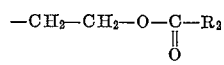

where $R_1$ is chosen from the group consisting of

—$CH_2$—$CH_2$—OH and

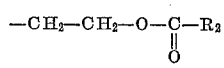

and where $R_2$ may be an alkyl radical containing from 1 to 23 carbon atoms.
2. As a composition of matter, the compound:
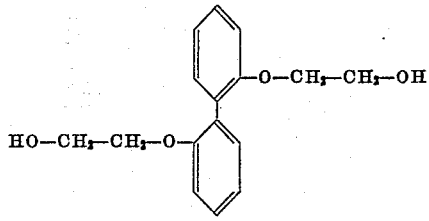
References Cited by the Examiner
UNITED STATES PATENTS
| | | |
|---|---|---|
| 1,955,998 | 4/34 | Zahn et al. _____ 260—479 |
| 2,140,824 | 12/38 | Vernon _____ 260—613 |
| 2,227,805 | 1/41 | Britton et al. _____ 260—613 |
| 2,267,756 | 12/41 | Schussler _____ 260—479 |
| 2,578,688 | 12/51 | Fraser _____ 260—31.2 |
| 2,666,039 | 1/54 | Reid et al. _____ 260—31.2 |
| 2,873,200 | 2/59 | Greenlee _____ 260—31.6 |
| 2,945,871 | 7/60 | Murray _____ 260—479 |
| 2,956,977 | 10/60 | Caldwell et al. _____ 260—31.2 |
CHARLES B. PARKER, *Primary Examiner.*
LEON J. BERCOVITZ, MORRIS LIEBMAN,
*Examiners.*

UNITED STATES PATENT OFFICE
CERTIFICATE OF CORRECTION

Patent No. 3,205,270 September 7, 1965

John J. Jaruzelski et al.

It is hereby certified that error appears in the above numbered patent requiring correction and that the said Letters Patent should read as corrected below.

Column 2, lines 7 to 15, the first formula should appear as shown below instead of as in the patent:

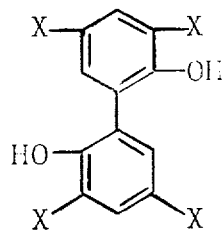

column 3, line 1, insert -- (III) -- above the formula; line 26, for "This" read -- That --; column 6, line 15, for "219°" read -- 219° C. --; column 7, Table II, first column, line 3 thereof, for "st" read -- at --; column 8, line 49, for " A composition" read -- As a composition --; lines 50 to 59, the formula should appear as shown below instead of as in the patent:

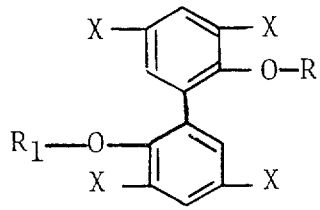

Signed and sealed this 5th day of April 1966.

(SEAL)
Attest:

ERNEST W. SWIDER
Attesting Officer

EDWARD J. BRENNER
Commissioner of Patents